No. 897,167.
PATENTED AUG. 25, 1908.
W. C. SIMS.
BORING MACHINE.
APPLICATION FILED APR. 4, 1907.
2 SHEETS—SHEET 2.
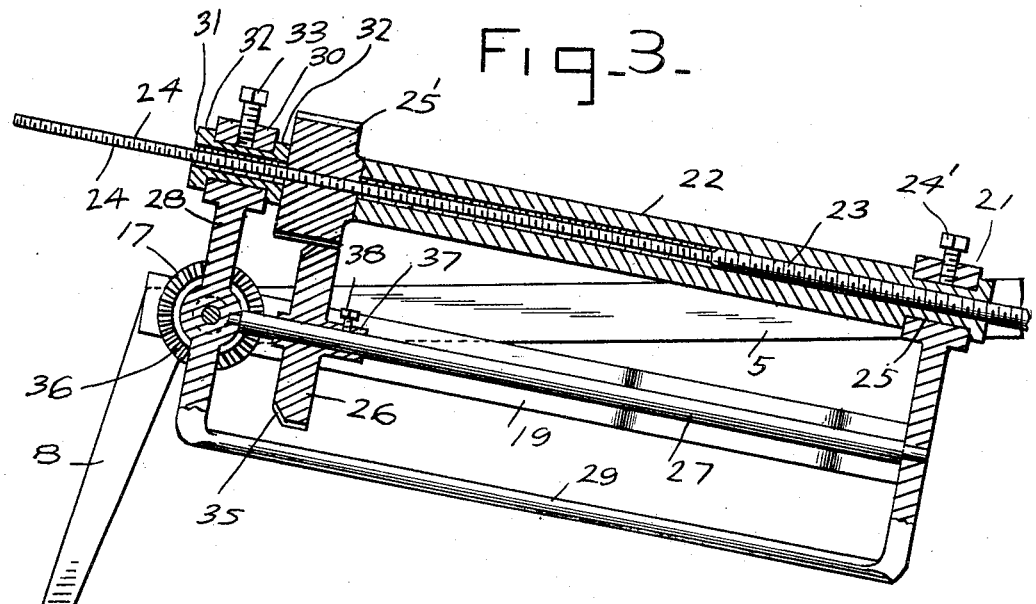
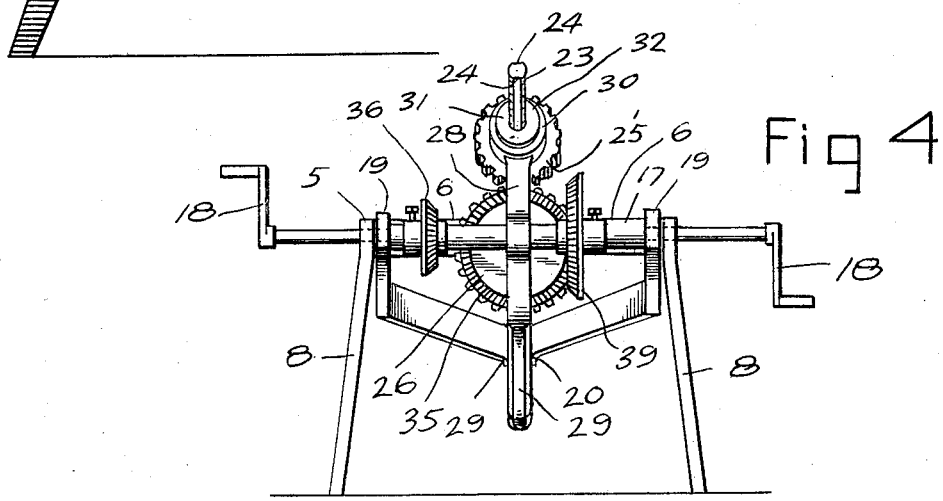
Witnesses
W. S. Rockwell
M. T. Miller
Inventor
W. C. Sims
By Chandlee & Chandlee
Attorneys

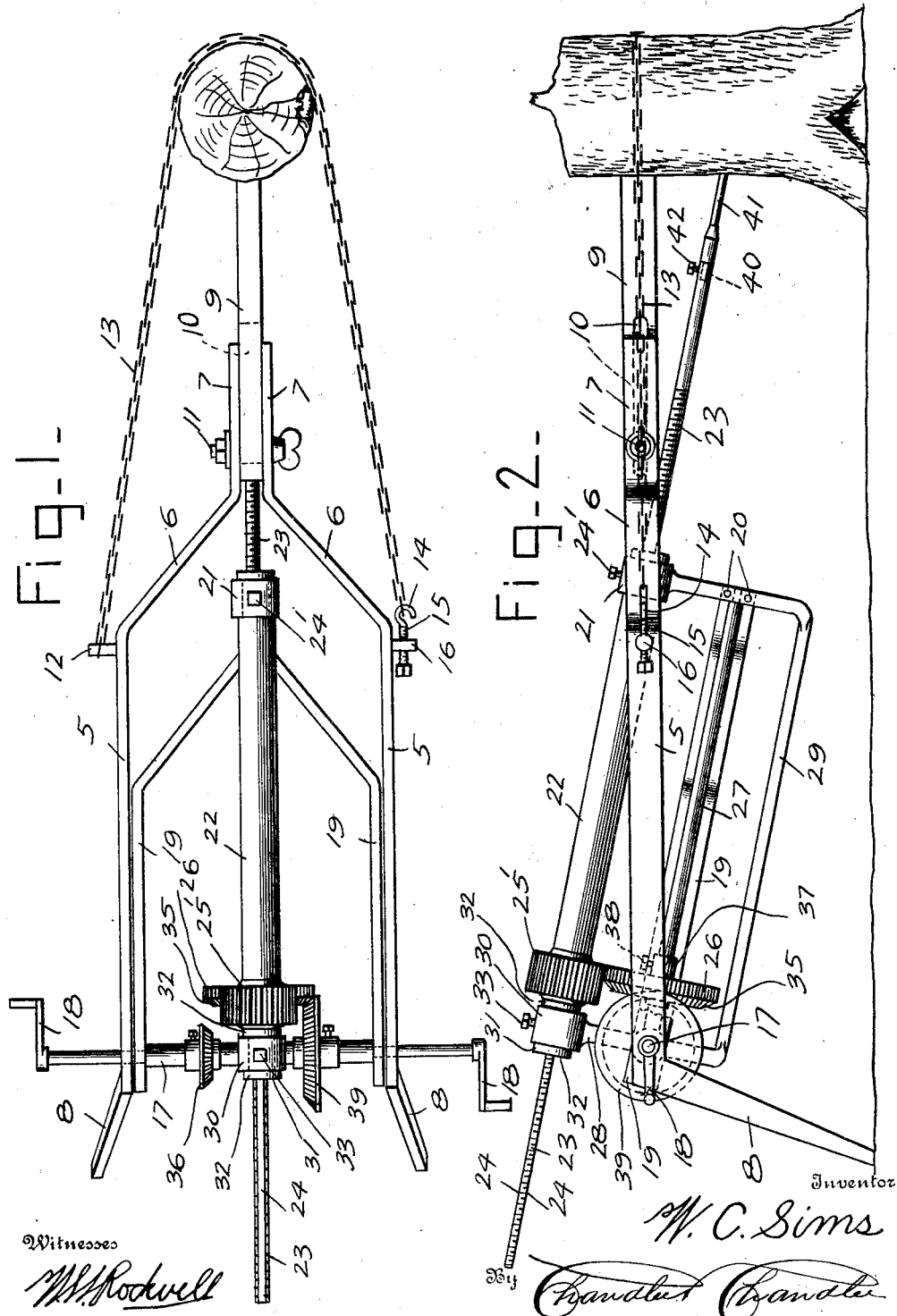

UNITED STATES PATENT OFFICE.

WILLIAM C. SIMS, OF SCRANTON, MISSISSIPPI.

BORING-MACHINE.

No. 897,167.  Specification of Letters Patent.  Patented Aug. 25, 1908.

Application filed April 4, 1907. Serial No. 366,335.

*To all whom it may concern:*

Be it known that I, WILLIAM C. SIMS, a citizen of the United States, residing at Scranton, in the county of Jackson, State of Mississippi, have invented certain new and useful Improvements in Boring-Machines; and I do hereby declare the following to be a full, clear, and exact description of the invention, such as will enable others skilled in the art to which it appertains to make and use the same.

This invention has relation to a new and useful improvement in boring machines.

The object of my invention is to provide a portable boring machine adapted to be adjustably attached to a stump for perforating the same by means of a suitable auger in order that the stump may be destroyed.

In the accompanying drawings Figure 1 is a top view of the machine showing its manner of use, Fig. 2 is a side elevation thereof, Fig. 3 is a detail vertical longitudinal sectional view through a portion of the machine taken in a line with the auger shaft, and Fig. 4 is a rear elevation of the machine.

In carrying out the object of my invention I use two equi-formed frame bars 5, 5, each bar having one end bent downward to form a supporting leg 8 while at the opposite ends these bars are bent laterally and then outwardly again to form the supporting ears 7 as is shown more clearly in Fig. 1. These ears are perforated and are adapted to receive the bolt 11. Passing through these frame bars 5, 5 and transversely held is a drive shaft 17 being provided with two terminal operating cranks 18 as indicated in Fig. 4.

Held between the ears 7 is a brace bar 9 provided with a slot which is shown in dotted lines in Fig. 2 through which slot the bolt 11 passes so that this brace bar 9 is adjustably held between the ears 7.

Held upon the drive shaft 17 are two equi-formed swinging frame members 19, 19 which at their forward ends are united by means of the bolts 20 to the forward upstanding end of the swinging bracket 29 as clearly shown in Fig. 2. This bracket 29 has two upstanding arms each ending in a terminal bearing, the forward bearing being marked 21 and the rear bearing 30, as clearly disclosed in Fig. 3. Below the bearing 30 is positioned a shaft bearing as shown in Fig. 3, through which bearing the drive shaft 17 passes as shown.

Held by the two upstanding arms is the gear shaft 27 as shown in Figs. 2 and 3. Adjustably held upon this gear shaft 27 is a double gear, the peripheral edge of which is provided with gear teeth 26 while the bevel edge is cut to form a bevel gear 25 as disclosed in Fig. 2. This double gear 26 is provided with the sleeve 37 supporting the set screw 38 so that this gear may be adjustably secured to the shaft.

Held within the terminal bearings 30 and 21 is a two-part sleeve, comprising the short sleeve member 32 and the extended sleeve member 22 as shown in Fig. 3. The sleeve member 22 is provided with a collar 25 to be journaled to the bearing 21, the stub sleeve 32 also being provided with a collar so that this stub sleeve is also journaled to its bearing 30. The bearing 30 is provided with a set screw 33 to lock the stub sleeve, while the bearing 21 has a set screw 24' to set extended sleeve 22. This two-part sleeve is interiorly threaded so that an operating screw 23 may be threaded through these two sleeves, this screw being provided with a flattened portion 24 upon which is splined the gear 25' which gear is interposed between the two-part sleeve members 22 and 32 as clearly disclosed in Fig. 3.

Secured to the drive-shaft 17 is a bevel gear 39 adapted to engage the double gear upon one side while upon the opposite side the shaft 17 is provided with a smaller pinion 36 also adapted to be brought into engagement with the bevel face of the double gear, so that two speeds may be imparted to the shaft 27. In Fig. 4 the pinion 39 is in engagement with the gear 26 to secure a fast speed. To impart a slow speed, the set screw securing the pinion 39 is loosened to slide back the gear 39 when the gear 26 is advanced so that the pinion 36 may be brought into engagement with this gear.

From this it will be seen that the shaft 27 may be rotated to impart a rotary movement to the gear 25' which is made sufficiently broad so that the double gear may be slid backward and forward. The sleeves 22 and 32 may be locked so that the screw 23 may be fed forward or backward, the shaft being manually operated may be moved forward or backward.

Having thus described my said invention what I claim is—

In a device of the character described the combination of the following instrumentalities, to wit: two equi-formed supporting frame bars, each having one end bent down to form a supporting leg, each other end being bent inward to form a supporting ear, said ears being perforated, a bolt passing through said perforations, a brace-bar having a slot held between said two ears and adjustable upon said bolt, a drive-shaft transversely held at the leg end of said frame bars, a swinging sleeve-carrying bracket having two upstanding arms, each ending in a terminal bearing, a shaft bearing below one of said terminal bearings, said drive shaft passing through said shaft bearing, two equi-formed swinging frame members, each being pivotally held at one end upon said drive-shaft and at the remaining end being secured to the forward swinging end of said sleeve-carrying bracket, a two-part sleeve provided with a threaded bore revolubly held within said terminal bearings, a screw passing through said sleeve, provided with a chuck at its forward end while its rear end is flattened, a gear interposed between said sleeves, said gear being splined upon the flattened end of said screw, a gear shaft revolubly carried by said swinging bracket, said gear shaft being positioned horizontally below said two part sleeve, a double gear adjustable upon said gear-shaft meshing with said gear upon said screw, and a pinion upon said drive shaft also meshing with said double gear, all arranged as set forth.

In testimony whereof, I affix my signature, in presence of two witnesses.

WILLIAM C. SIMS.

Witnesses:
 H. M. CANTY,
 JNO. J. CLARK.